US007016899B1

(12) United States Patent
Stern et al.

(10) Patent No.: US 7,016,899 B1
(45) Date of Patent: Mar. 21, 2006

(54) CAMERA DEVICE, METHODS AND PROGRAM PRODUCTS FOR LOCATION AND ENVIRONMENTAL STAMPING OF IMAGES, COMMUNICATIONS AND OTHER APPLICATIONS

(75) Inventors: Edith H. Stern, Yorktown Heights, NY (US); Barry E. Willner, Briarcliff Manor, NY (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 355 days.

(21) Appl. No.: 09/666,864

(22) Filed: Sep. 21, 2000

(51) Int. Cl.
*G06F 17/30* (2006.01)

(52) U.S. Cl. ......................... 707/10; 707/3; 707/104.1; 709/206

(58) Field of Classification Search .................... 707/2, 707/10, 513, 3, 7, 104.1; 709/206, 219; 340/539; 382/313; 386/46, 117; 701/201, 208, 209; 345/428, 619; 348/239, 603
See application file for complete search history.

(56) References Cited

U.S. PATENT DOCUMENTS

| | | | | |
|---|---|---|---|---|
| 5,267,042 | A | 11/1993 | Tsuchiya et al. | 358/209 |
| 5,506,644 | A | 4/1996 | Suzuki et al. | 354/106 |
| 5,515,042 | A | 5/1996 | Nelson | 340/937 |
| 5,642,285 | A | 6/1997 | Woo et al. | 364/449 |
| 5,910,986 | A | 6/1999 | Dove | 380/23 |
| 6,085,185 | A * | 7/2000 | Matsuzawa et al. | 707/2 |
| 6,085,195 | A * | 7/2000 | Hoyt et al. | 707/10 |
| 6,141,666 | A * | 10/2000 | Tobin | 707/513 |
| 6,161,131 | A * | 12/2000 | Garfinkle | 709/206 |
| 6,222,449 | B1 * | 4/2001 | Twining | 340/539 |
| 6,282,362 | B1 * | 8/2001 | Murphy et al. | 386/46 |
| 6,282,489 | B1 * | 8/2001 | Bellesfield et al. | 701/201 |
| 6,292,228 | B1 * | 9/2001 | Cho | 348/603 |
| 6,292,595 | B1 * | 9/2001 | Petteruti et al. | 382/313 |
| 6,462,778 | B1 * | 10/2002 | Abram et al. | 348/239 |
| 6,463,426 | B1 * | 10/2002 | Lipson et al. | 707/3 |
| 6,463,463 | B1 * | 10/2002 | Godfrey et al. | 709/206 |
| 6,490,409 | B1 * | 12/2002 | Walker | 386/117 |
| 6,577,311 | B1 * | 6/2003 | Crosby et al. | 345/428 |

* cited by examiner

*Primary Examiner*—Jeffrey Gaffin
*Assistant Examiner*—Hassan Mahmoudi
(74) *Attorney, Agent, or Firm*—Joseph C. Redmond, Jr.; Morgan & Finnegan, LLP

(57) ABSTRACT

A portable imaging device having a data processing system, imaging and sensing devices records objects of interest as images and includes a terminal connection for transmitting the images to a network. Sensing devices record location and environmental conditions related to the object of interest. The device is linked to a positioning determining system. The device records an image and environmental information related to the image and incorporates into the image stored descriptive information based on location information. The image may be translated into an analog or digital picture incorporating the recorded location, environmental and descriptive information. The device may be linked by wire or wirelessly via the terminal connection to a network including a server and a PC terminal. The recorded image, location and environmental information are transmitted by the device over the network to the server using a wireless connection for download and editing by a user.

32 Claims, 4 Drawing Sheets

Example Device – Location aware camera

CAMERA DEVICE, METHODS AND PROGRAM PRODUCTS FOR LOCATION AND ENVIRONMENTAL STAMPING OF IMAGES, COMMUNICATIONS AND OTHER APPLICATIONS

BACKGROUND OF INVENTION

1. Field of Invention

This invention relates to recording systems and methods of operation. More particularly, the invention relates to devices, methods and program products for location and environmental stamping of images, communications and other applications.

2. Description of Prior Art

Location and environmental stamping of images, communications and other applications provide a record of importance similar to time stamping in message processing, time recording, library activities and other applications. The availability of the omnipresent Global Positioning Systems (GPS) and other locating systems facilitates location stamping of objects of interest, e.g. momuments, scenic sites, travel points or any view of interest related to the GPS coordinates in images or pictures, email and other communications. Further, the miniaturization of electronic devices for environmental measuring, e.g., temperature, pressure, humidity facilitates environmental recording. Location and environmental stamping add another dimension to recording objects of interest, particularly in imaging applications. The stampings are further enhanced by including in the recording descriptive text of the object of interest. Moreover, the GPS coordinates enable an image of an object interest to be stored in a network for later recall by a terminal.

What is needed in the art is a pervasive device, system and method exploiting network and data processing techniques for location and environmental stamping of objects of interest including descriptive text to enhance and readily recall recorded images for the general public, educational and business communities.

Prior art related to recording objects of interest includes the following:

In U.S. Pat. No. 5,506,644 entitled "Camera" issued Apr. 9, 1996, discloses a position information recorder incorporated in a camera. A position-measuring unit receives position information via a GPS satellite and performs position measurements to calculate a position. A receiving state determination unit determines the state of receiving the position information. A memory stores the position measurement data, and a magnetic recording unit records data in the magnetic recording area of film. When position measurement data cannot be fetched, position measurement information stored in the memory immediately before is read out and recorded.

U.S. Pat. No. 5,642,285 entitled "Outdoor Movie Camera GPS-Position and Time Code Data-Logging for Special Effects Production", issued Jun. 24, 1997 discloses a GPS navigator receiver with a data output port for communicating a position estimate frame-by-frame and time codes in SMPTE format. The conventional date and time sequence output of the GPS navigation receiver is combined with a highly accurate one pulse per second (±1 microsecond) to perform a timekeeping base for the time code output. A data logger records the position estimate with their corresponding time in time code format frame-by-frame in a database. Recorded position estimates are then used in special-effects post-production to direct the special effects animation, modeling kinetics, etc. in a composite, final film or video.

U.S. Pat. No. 5,267,042 entitled "Image Pickup Device for Automatically Recording the Location Where an Image is Recorded", issued Nov. 30, 1993, discloses an image pickup device body for recording an image object. A position detection means detects the present location of the image pickup device body to record the resulting position data at the same time when the object image is recorded onto the image recording medium by the recording means.

U.S. Pat. No. 5,515,042, entitled "Traffic Enforcement Device", issued May 7, 1996 discloses a traffic monitoring an evidence gathering device which can be mounted in a movable monitoring vehicle to monitor vehicle traffic speed. When a speeding violation is detected, the device generates a vehicle-identifying image having date, time, and vehicle speed and location information imposed thereon. The device includes a speed detector operable coupled with a camera and a global positioning monitor. The monitor is also connected to the camera. When a monitored vehicle's speeds exceeds a predetermined magnitude, the detector generates an output serving to initiate operation on the camera and satellite monitor and to deliver speed information to the camera. The camera creates a vehicle-identifying image and imposes on the image the speed and position information.

U.S. Pat. No. 5,910,986, entitled "Methods and Apparatus for Sending Electronic Signals", issued Jun. 8, 1999, discloses a time stamp and a location stamp included in a request for sensitive information required to be sent over an open network, such as the Internet. The time stamp carries the time in which a previous page in the application was sent to the client. The location stamp carries the client address as provided for that previous page. Preferably, the stamps are encrypted and are thus protected at the user location.

None of the prior art discloses a pervasive device and method of operation exploiting network and data processing techniques for correlating location and environmentally sensed information of an object of interest with stored information in a database in the device or in a network linked to the device for recording or stamping and readily recalling an object of interest in an image, communication or other medium.

SUMMARY OF THE INVENTION

An object of the invention is a recording system and method of operation for sensing and incorporating in a medium, location and/or environmental sensed information related to an object of interest.

Another object is a device and method of operation for recording in a medium, location and/or environmental information, including descriptive text, related to an object of interest.

Another object is a device and method of operation exploiting data processing techniques for supplementing sensed location and/or environmental information with additional information related to an object of interest for recording in a medium.

Another object is a portable device linked to a network for collecting and correlating location and/or environmental information related to an object of interest for recording in a medium.

Another object is a portable device including software for imaging an object of interest and collecting, storing and supplementing location and/or environmental information related to the object for incorporation in a film or video or like media.

Another object is a system and method for recalling and incorporating stored images in a communication according to location coordinates.

These and other objects, features and advantages are achieved in a first embodiment in which a portable imaging device includes a data processing system, imaging and sensing devices for recording objects of interest and a terminal connection for transmitting the image to a network. The sensing devices record location and environmental conditions related to the object of interest. The device is linked to a positioning determining system, e.g. the Global Positioning System or other positioning system. The device records an image and environmental information of an object of interest in a medium and incorporates into the image stored descriptive information of the object based on GPS or other location coordinates. The medium may be translated into an analog or digital picture incorporating the recorded location, environmental and descriptive information. In another embodiment, the device may be linked by wire or wirelessly via the terminal connection to a network including a server and a PC terminal or workstation. The recorded image, location and environmental information are transmitted by the device over the network to the server using a wireless connection. The server correlates stored descriptive information with the location and/or environmental sensed information for download to the PC terminal when the user accesses the server for display and/or editing of the image. At the user's direction, the PC prints out the image as a picture including the recorded location, environmental and descriptive information on the front, back or near the picture. In still another embodiment, a user visiting an object of interest sends a communication, e.g. an email over the network using a portable terminal. The email includes the GPS coordinates for the object as provided by location determining means incorporated in the portable terminal. The server includes a database of GPS coordinates and corresponding "thumbnail images" of objects of interest and incorporates into the email the "thumbnail" image corresponding to the GPS coordinates.

DESCRIPTION OF THE DRAWINGS

The invention will be further understood from the following detailed description of a preferred embodiment, taken in conjunction with an appended drawing, in which:

FIG. 1 is a representation of a system incorporating the principles of the present invention for collecting, storing and correlating image data with location and/or environmental information relating to an object of interest for recall and/or incorporation in a medium, as a display or in a message or the like.

DETAILED DESCRIPTION OF PREFERRED EMBODIMENT

Figure 1:
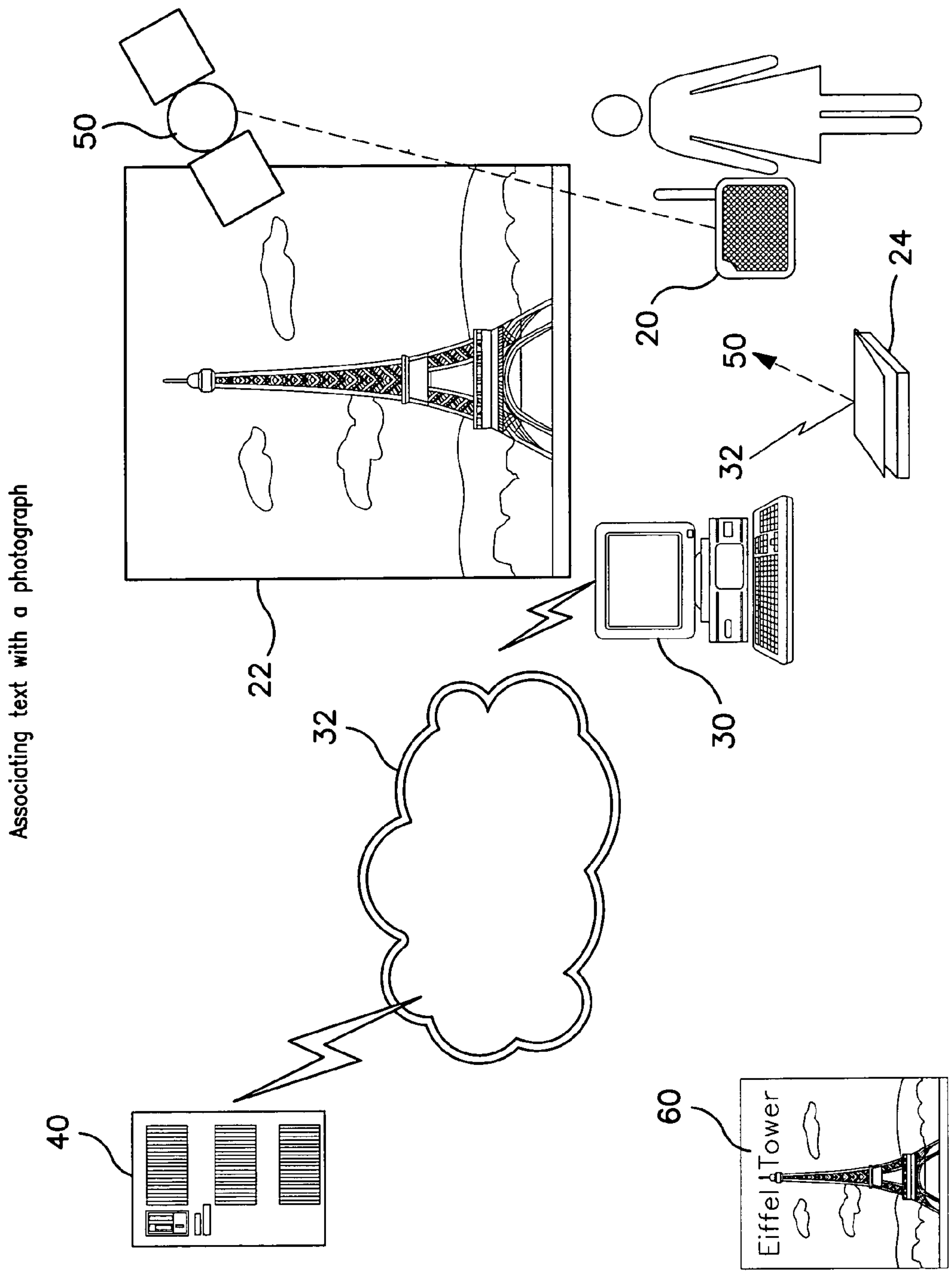

FIG. 1 is an overview of the device and system for location and/or environmental stamping related to an image or communication of object of interest. A user with a device 20, built in accord with the invention, captures an image of a local site 22 of interest. The device 20 determines its location by means of accessing the GPS satellite system. One such satellite (50) is shown in FIG. 1. The location coordinates are retained in a database (not shown contained in a memory 160 (See FIG. 2) along with the picture that was taken of the site, as one example of an object of interest. An environmental probe sensor 220 (See FIG. 2), such as those available from TPI Corporation, 3 Greta Road, Grafton, Mass., 01519, USA senses environmental conditions, e.g. temperature, pressure, humidity, etc. related to the picture and the location coordinates. Later, the picture and associated location coordinates and/or sensed environmental conditions are transferred to a PC device or workstation 30 in a digital communication via a network 32, typically the Internet, and a server 40, as will be explained in more detail hereinafter. The server 40 recognizes the coordinates of the site from a stored table and generates a textual description of the site for download to the PC along with the picture, location and environmental condition associated with the picture. When the picture 60 is printed out by the device 30, the location, textual descriptions and/or environmental conditions are superimposed upon the picture. Alternately, the location could be printed near the picture or on the back.

In an alternate embodiment, the server 40 may return the textual description to the device 20 which stores the textual description in the database for display of the image 60 in the viewfinder along with the textual description and environmental conditions.

Figure 2:
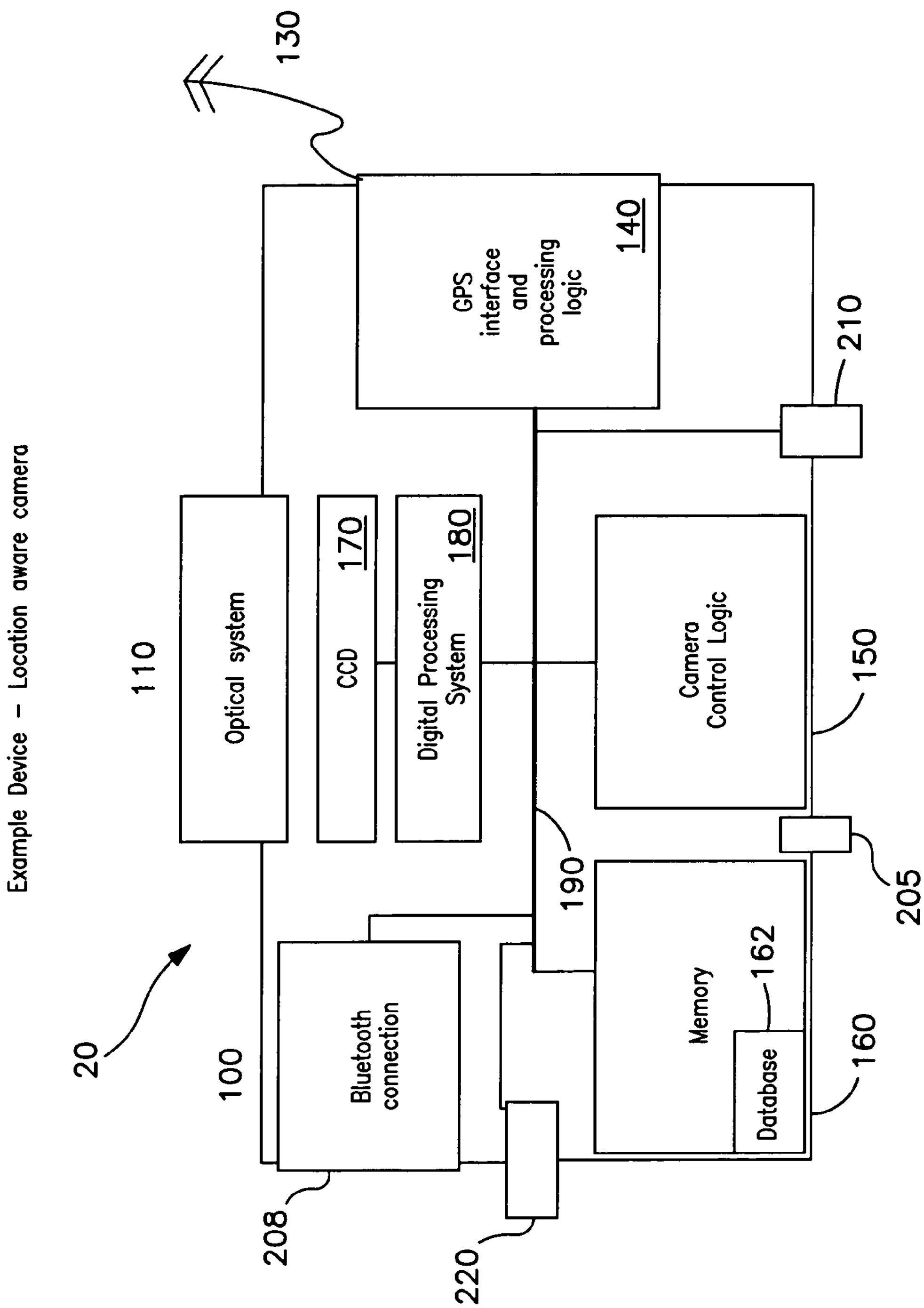
FIG. 2 is a block diagram of the portable-imaging device included in the system of FIG. 1.

In FIG. 2, the portable device 20 may be a digital camera, which focuses an image through a conventional optical system 110 onto a charged-coupled device (CCD) 170. A digital processing system 180 in the camera is programmed to receive the output of the charge couple device, compress the digital image, and deliver the compressed image over bus 190 for storage in a memory 160 using well know compression techniques. An antenna 130 couples a GPS unit 140 to the satellite 50 (See FIG. 1) and receives location signals for the device 20. The unit 140 processes the signals using calculations well known in the art to determine location coordinates of the image for storage in the memory 160 coupled to the bus 190. The environmental probe 220 captures the environmental conditions in digital form at the location and supplies them to the data processing system 180 via the bus 190 for determining the environmental conditions, e.g. temperature, pressure, humidity using software applications provided by the probe manufacturer. A location mode selector switch 205 can be set to indicate the user's desire as to whether location and/or environmental information should be associated with the image. Camera control logic 150 described for example in U.S. Pat. No. 5,015,107 directs the data processing system to capture the current image from the CCD and directs both the location and environmental control logic to capture the current location and environmental sensed information for storage in the memory 160. The camera control logic correlates the location coordinates and environmental information with the contents of the image. The contents of the memory are communicated through an external communication link 208 to the network 32. One example of a network link is a Bluetooth Wireless Connection, developed by the Bluetooth Special Interest Group and described in the Bluetooth Protocol Architecture, Version 1, Document No. 1.C.120/1.0, dated Aug. 25, 1999 and available from Nokia Corporation, (address to be supplied). A trigger switch 210 initiates operation of the device 20.

In operation, when a user depresses the trigger button 210 to capture a picture or object of interest, the digital processing system 180 is activated to take the output of the CCD in digital format, compress and output the image over the internal bus 190 to the memory 160. If the location mode selector switch 205 is operated, the location information associated with the picture is obtained through the GPS interface and processing logic 140. The location coordinates from the GPS interface are outputted over the internal bus 190 and stored in the memory 160 with the digital image. The environmental information is collected by the sensor 220 and transmitted to the memory over the internal bus. In one embodiment, a connection is established by the unit 208 from the digital camera to a PC or workstation having Internet connectivity. Once the PC connectivity between the workstation and the portable device is established, the PC contains software, which prompts the user to select an editing mode. If the user wishes to actively edit the picture, an edit mode indicator is set. The image and the associated location and environmental information for the image are communicated to the PC. The PC signs on to a server to obtain descriptive material related to the location coordinates. The server based on the location coordinates accesses the server memory for a textual description related to the coordinates and stored in advance in the server memory. In some instances, the user can select among several stored descriptions and the selected description is associated with the picture along with the location coordinates and environmental information. The picture is printed with the selected description, location coordinates and environmental information. If the Internet mode is not selected, a default description stored in a database in the camera is associated with the picture. The picture is then printed with the default description, location coordinates and environmental information in a manner well known in the digital cameras art.

Figure 3:
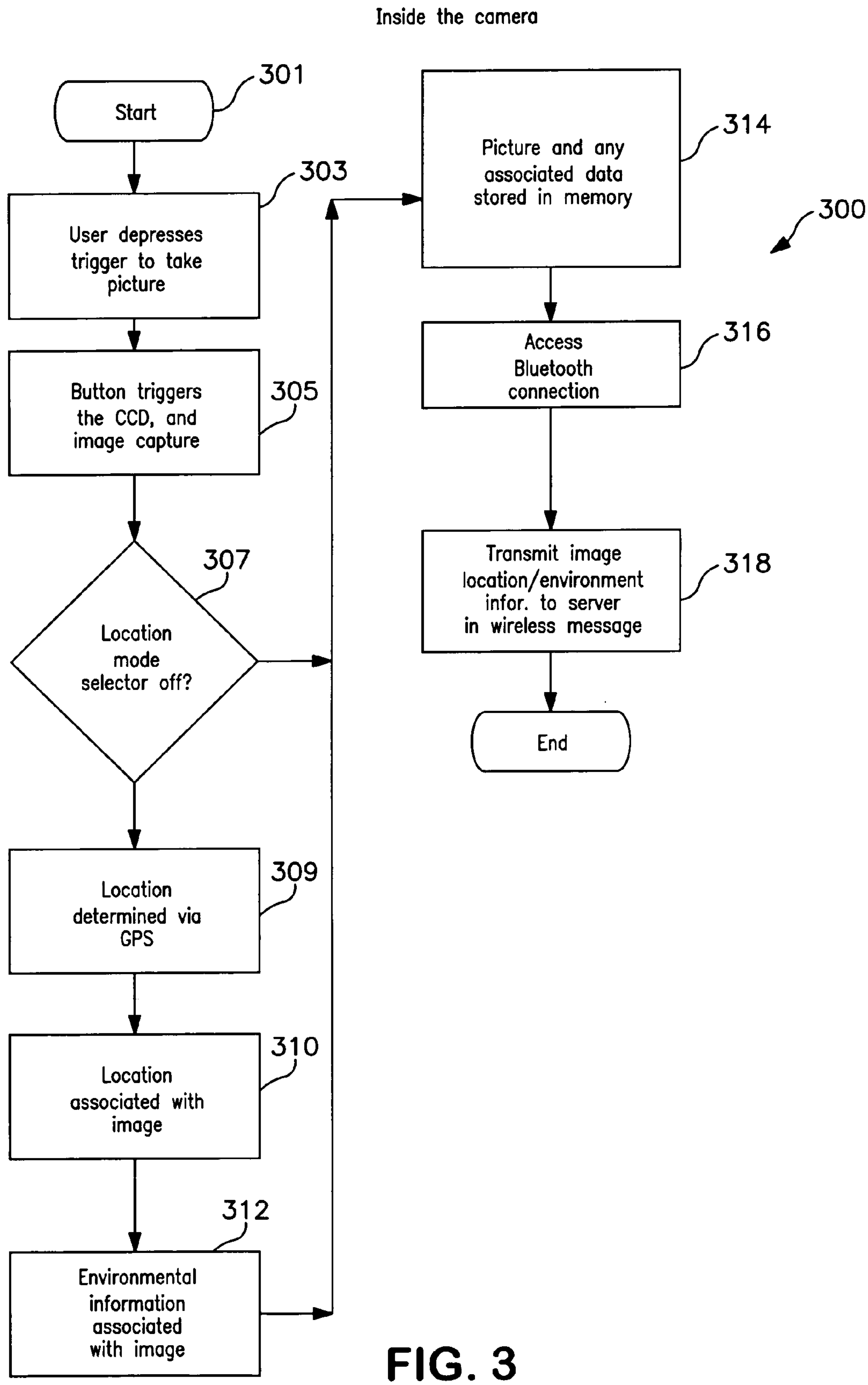
FIG. 3 is a flow diagram for processing image, location and environmental information in the portable imaging device of FIG. 2.

FIG. 3 taken in conjunction with FIGS. 1 and 2 describe a process 300 inside the camera 20 when an image 22 is recorded. The process is started in step 301 when a user presses the trigger button 210 in step 303 to capture the image 22. The digital processing system 180 is activated to take the output of the CCD 170 in step 305 and process the image in digital form in a manner well known in the art; compress, and output the image over the internal bus 190 to the memory 160. In step 307, a test is performed to determine if the location mode selection switch 205 is operative. Normally the switch has an "ON" or "OFF" state. Alternatively, the switch may have several states for displaying the image alone or with location information or with environmental information or combined location and environmental information. If operative in the combined location/environmental state, the location information is acquired from the GPS unit 140 in step 309 for association with the image in step 310. Environmental information sensed by the probe 220 is processed in the system 180 and combined with the location associated for the image in step 312. The image and the associated location and environmental data are stored in the memory 160 in step 314.

Returning to the test 307, if the location mode selector is "OFF" the image is stored in the memory 160 without the location and environmental information in step 314, after which the process accesses the Bluetooth Wireless Connection 316 to connect to the server 40, via the PC 30 using the Bluetooth Protocol, previously described. In step 318, after connection to the server, the device 20 transmits the image data and stored location and environmental information in a wireless message to the server for storage.

Figure 4:
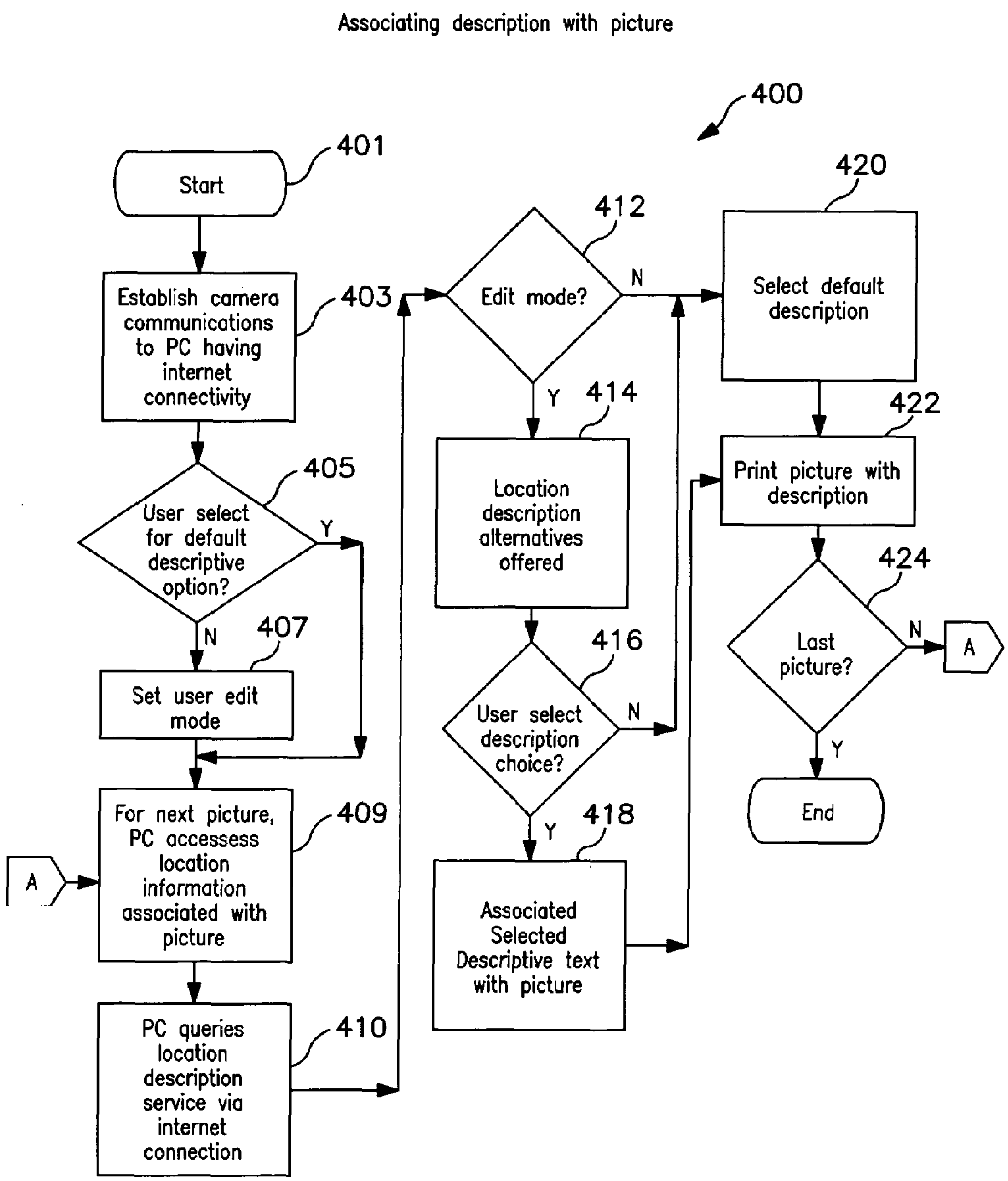
FIG. 4 is a flow diagram using the system of FIG. 1 for incorporating location and an environmental information in an image of an object of interest and/or recall of the image in a communication according to the location information.

FIG. 4 taken in conjunction with FIGS. 1 and 2 describes a process 400 for processing the image in the device 20 by an external device, e.g. a PC 30 having an Internet connection. The process is initiated in step 401, and in step 403 a network connection is established between the digital camera 20, and the PC 30 having Internet connectivity. In a preferred embodiment, a wireless connection is established between the camera 20 and the PC 30 via a Bluetooth protocol. Once the PC connectivity to the camera is established, the PC software prompts the user to choose the desired edit mode in step 405. If the user wishes to actively edit the pictures, an edit mode indicator is set in step 407 otherwise the step 407 is bypassed. In step 409, the associated location and/or environmental information are communicated to the PC via the database 162 in the device 20.or from the server 40. In the case of the server, the user accesses the server for the stored image, location coordinates etc using standard Internet protocols. The location information is used in step 410 to access descriptive materials from the server 40 via the Internet connection. If edit mode is chosen in step 412, all available descriptions are presented to the user in step 414 for user selection in step 416. The user can select one of these descriptions, and in step 418, the selected description is associated with the image. In step 420 the image is printed as the picture 60 with the selected description and/or environmental conditions at the location. If edit mode had not been chosen, a default description is associated with the picture in step 422. In step 420, the picture is then printed with the default description in a manner well known in the art of digital cameras. Steps 401 through 422 are repeated for each picture by returning to the entry point in step 401 until the last picture is printed in step 424 upon which the process ends.

As an alternative to printing, in step 420 (480), the image with the selected descriptive text can be stored. This storage can take place in the camera device 20, in the associated PC 30, or in a server connected to the Internet.

As an alternative to capturing an image of an object of interest with location and environmental information, another embodiment in FIG. 1 enables a user visiting a location to obtain a representative image from a remote database, in lieu of taking a picture, and include the representative image in an email as an indication of the sender location. In this embodiment, a laptop or Personal Digital Assistant (PDA) 24 includes an ability to determine location coordinates from the GPS satellite system 50 or other location coordinate determining means. The laptop is linked by wire or wireless to the network 32. The server 40 stores images according to their GPS or other coordinates. In generating an email, a user of device 24 at a location, in lieu of taking a picture, transmits the GPS coordinates thereof to the server as an image request before, during or after composing the message. The server in processing the image request recognizes the GPS or other location coordinates and correlates the coordinates with the stored images. The server returns at least one image to the laptop for inclusion in an email. The user composes and transmits the email to the recipient(s) with the image associated with the location at which the email was created.

Alternatively, an email may be composed by a user including the GPS coordinates for the location provided by the laptop. The email system or recipient's system interacts with the server 40 to obtain and insert the image in the message corresponding to the GPS coordinates. This embodiment enables a commercial enterprise to advertise an attraction, e.g. hotel or theme park, in lieu of postcards of the attraction, by supplying images of the attraction to the server for distribution to travel agencies and others on an agreed fee basis. The enterprise may also provide incentives to the users of the portable device 20 to employ a "thumbnail" image of the attraction or enterprise stored in the server 40 within the user's email.

Having described the invention in a preferred embodiment, various changes can be made without departing from the spirit and scope of the invention as defined in the appended claims, in which

We claim:

1. A system for incorporating images in an electronic message, comprising:

a) means for obtaining geographical coordinates of a location;

b) means for providing the geographical location coordinates to a network and obtaining images from the network according to the geographical location coordinates c) means for accessing location images, in lieu of taking a picture, stored in the network according to the geographical location coordinates;

d) a terminal for generating electronic messages wherein the terminal is a laptop or personal digital assistant or other computer device and linked to a network by a wired or wireless connection; and e) means for incorporating in an electronic message transmitted over the network, where the message was created, at least one of the location images obtained from the network.

2. The system of claim 1 wherein the geographical location coordinates provided to the network are the geographical location coordinates of the terminal creating the message.

3. The system of claim 1 wherein the geographical location coordinates are established at the completion of the creation of the electronic message.

4. The system of claim 1 wherein the geographical location coordinates are established at the start of the creation of the electronic message.

5. In a system including an image-collecting device coupled to a remote data processing system and a workstation via a network using network protocols, a method for recording an image including a geographical location, and/or environmental conditions in a medium, comprising the steps of:

a) forming an electronic image of an object of interest in digital form in the image-collecting device;

b) determining a geographical location of the image in digital form;

c) capturing and storing the digital image and the geographical location thereof in a memory;

d) storing descriptive text of a plurality of objects of interest related to the digital image at a geographical location in a remote processing system or workstation;

e) communicating with and accessing the remote processing system or workstation wherein accessing the remote processing system or workstation correlates and records the digital image with the geographical location, and descriptive text associated with the object of interest in a medium;

f) selecting and associating the descriptive text with the digital image in the work station; and g) printing the digital image with the geographical location, and descriptive text associated with the object of interest in the medium at the workstation.

6. The method of claim 5 wherein the step of forming an electronic image further comprises the step of:

a1) receiving and converting optical information of the object of interest into compressed digital form.

7. The method of claim 5 further comprising the step of:

h) converting satellite signals into geographical coordinates in digital form indicative of the image geographical location.

8. The method of claim 5 further comprising the step of h) selecting the stored descriptive text related to the object of interest at the geographical location to be recorded in the digital image.

9. The method of claim 5 wherein the step of determining geographical location includes determining latitude and longitude.

10. The method of claim 5 further comprising the step of:

h) collecting and storing environmental conditions at a geographical location related to the image for recording in the medium.

11. The method of claim 5 further comprising the step of:

h) connecting and providing to a network using network protocols, the image, geographical location, and environmental conditions of the object of interest stored in the image-collecting device for processing and recording in a medium by the network.

12. The method of claim 5 further comprising the step of:

h) storing thumbnail images related to objects of interest in the remote data processing system according to geographical location coordinates.

13. The method of claim 5 further comprising the step of:

h) transmitting geographical location coordinates of an object of interest to the remote data processing system;

i) receiving a thumbnail image related to the geographical location coordinates from the remote data processing system; and recording the related thumbnail image in the medium.

14. The method of claim 5 further comprising the step of:

h) editing the image to include the related geographical location and descriptive text.

15. The method of claim 5 wherein the obtained images are provided as part of advertising.

16. The method of claim 5 further comprising the step of:

h) offering the images to users in a prioritized manner based on the amount of payment associated with each image.

17. The method of claim 5 further comprising the step of:

h) providing the sender of an electronic message an incentive to include an advertising image in the message.

18. In an article of manufacture:

A program medium, executable in a computer system, for recording all image including a related descriptive text, geographical location information and/or environmental conditions in a medium, comprising:

a) program instruction in the medium forming an electronic image of an object of interest in digital form;

b) program instruction in the medium determining a geographical location of the image in digital form;

c) program instruction in the medium capturing and storing the digital image and the geographical location thereof in an image-collecting device wherein the program instructions convert satellite signals into geographical coordinates in digital form indicative of the image geographical location for storage in the image-collecting device;

d) program instruction in the medium for storing and accessing descriptive text of a plurality of objects of interest related to the image at a geographical location in a remote data processing system or workstation, wherein accessing the remote processing system or workstation correlates and records the digital image with the geographical location, and descriptive text associated with the object of interest in a medium;

e) program instructions in the medium for accessing and correlating the digital image with the geographic location at the workstation;

f) program instructions in the medium for programmatically correlating the descriptive text with the image at the geographical location under user direction; and g) program instructions in the medium enabling selection and recording the image with the geographical location and associated descriptive text in a picture.

19. The program medium of claim 18 further comprising:

h) program instructions for converting satellite signals into geographical coordinates in digital form indicative of the image geographical location for storage in an image collecting device.

20. The program medium of claim 18 further comprising:

h) program instruction in the medium collecting and storing environmental conditions related to the image at a geographical location for recording in the medium.

21. The program medium of claim 18 further comprising:

h) program instruction in the medium for accessing thumbnail images of objects of interest in the remote data processing system according to geographical location coordinates.

22. The program medium of claim 18 further comprising:

h) program instruction in the medium obtaining and inserting a thumbnail of an object of interest according to geographical location coordinates and storing in a medium.

23. A camera device for recording an image including a geographical location, environmental conditions at the location and related descriptive text in a medium, comprising:

a) means for forming an electronic image of an object of interest in digital form;

b) means for determining a geographical location of the image and related environmental conditions;

c) means for recording the image, environmental conditions and related geographical location;

d) means for communicating the recorded image, environmental conditions with related geographical location to a network for subsequent processing;

e) a server in the network for storing descriptive text of objects of interest; and f) means for communicating with and accessing the server for programmatically correlating and recording the digital image with geographical location, environmental conditions and descriptive text associated with the object of interest in a medium under user control.

24. A camera device for recording an image including a geographical location, related descriptive text and/or environmental conditions in a medium, comprising:

a) means for forming an electronic image of an object of interest in digital form;

b) means for determining a geographical location of the image in digital form;

c) means for storing the digital image and the geographical location thereof in a memory;

d) means for storing and accessing descriptive text related to the image at the geographical location;

e) means for selecting and correlating the descriptive text with the image at the geographical location;

f) means for recording the image, related geographical location and descriptive text;

g) means for communicating the recorded image with or without related geographical location and descriptive text to a network for subsequent processing using network protocols;

h) a server in the network for storing descriptive text of objects of interest; and i) means under user control for communicating with and accessing the server for correlating and recording the digital image with geographical location and descriptive text stored in the server associated with the object of interest in a medium.

25. The device of claim 24 wherein the means for forming an electronic image further comprises:

a1) data processing means responsive to control means for receiving and converting optical information of the image and correlating location and environmental information with the contents of the image into compressed digital form for storage in a local memory.

26. The device of claim 24 wherein means for determining the geographical location of the image further comprise:

b1) a GPS interface and processing logic unit linked to at least one space satellite for converting satellite signals into geographical coordinates in digital form for storage in the memory and indicative of the image geographical, location.

27. The device of claim 24 wherein the means for accessing descriptive texts of a plurality of objects of interest further comprises:

d1) a network interface to a database responsive to a user for selecting the stored descriptive text related to the object of interest recorded in the digital image.

28. The device of claim 24 further comprising:

j) environmental sensing means for collecting and storing environmental conditions related to the image at a geographical location for recording in the medium.

29. The device of claim 24 further comprising:

j) wireless means for connecting and providing to the network the geographic location and environmental conditions of the object of interest stored in the memory for processing and recording in a medium by the network.

30. The device of claim 29 further comprising k) a terminal coupled to the network and responsive to a user to obtain, display and record the geographical location and descriptive text in the medium.

31. The device of claim 24 wherein said means of communicating includes wireless communication.

32. The device of claim 24 further comprising:

j) a terminal coupled to the network and responsive to a user input to obtain, select, display and record the stored image of the object of interest with or without geographical location and descriptive text in the medium.

* * * * *